(12) United States Patent
Wieringa et al.

(10) Patent No.: US 7,168,204 B2
(45) Date of Patent: Jan. 30, 2007

(54) BOX FOR STORING FISHING FLIES

(75) Inventors: Jeffrey L. Wieringa, West Lakeland, MN (US); John E. Stark, Maplewood, MN (US); Gary A. Albrecht, Mahtomedi, MN (US); Steven R. Lambert, Princeton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/869,227

(22) Filed: Jun. 16, 2004

(65) Prior Publication Data

US 2005/0279012 A1    Dec. 22, 2005

(51) Int. Cl.
*A01K 97/06*    (2006.01)
(52) U.S. Cl. .................... 43/57.1; 43/54.1; 206/315.11
(58) Field of Classification Search .............. 43/54.1, 43/57.1; 206/315.11
See application file for complete search history.

(56) References Cited

U.S. PATENT DOCUMENTS 2,125,856 A * 8/1938 De Witt ...................... 220/532

(Continued)

OTHER PUBLICATIONS

Scientific Anglers catalog showing on p. 45 a waterproof fly box described from p. 1 line 22 through p. 2, line 7 of the specification.

(Continued)

*Primary Examiner*—Kurt Rowan
(74) *Attorney, Agent, or Firm*—William L. Huebsch

(57) ABSTRACT

A box for storing flies used for fishing including a cover assembly having two dish-like cover portions, each of which cover portions includes a central wall part, and side wall parts around the periphery of the central wall part projecting generally in the same direction away from the central wall part and having a continuous distal edge portion; and a hinge having hinge portions attached to the side wall parts adjacent second sides of the central wall parts. The hinge affords pivotal movement of the cover portions between a closed position with the distal edge portions of the cover portions opposed to, closely spaced from, and generally aligned with each other, and an open position with the distal edge portions spaced away and out of alignment with each other. A fly retaining assembly included in the box comprises a stiff resiliently flexible support plate having opposite major surfaces that extends between the distal edge portions of the cover portions when the cover portions are in the closed position, and has material adapted to be releasably engaged by flies on each of its major surfaces. Releasably engageable means can be provided between the support plate and the hinge for affording pivotal movement of the fly retaining assembly relative to the hinge independent of the cover portions when the cover portions are in their open position. A layer of flexible sealing material can be provided by over molding on each of the major surfaces of the support plate that is in sealing engagement with the edge portion of the adjacent cover portion when the cover portions are in their closed position, and material adapted to be releasably engaged by flies is provided on each major surface of the support plate, in a position that will be surrounded by the side wall parts of the adjacent cover portion when the cover portions are in their closed position. A latch member is provided along a second side of the periphery of the support plate opposite its first side. That latch member has opposite portions each adapted for releasable engagement with a different one of the cover portions to releasably retain the cover portions in their closed position.

14 Claims, 5 Drawing Sheets

U.S. PATENT DOCUMENTS

| | | | | |
|---|---|---|---|---|
| 2,558,124 | A * | 6/1951 | Burden | 43/57.1 |
| 2,999,621 | A * | 9/1961 | Kiser | 224/199 |
| 3,310,905 | A | 3/1967 | Davis et al. | |
| 3,346,313 | A * | 10/1967 | Fee | 312/234.1 |
| 3,490,169 | A * | 1/1970 | Tweed | 43/57.1 |
| 3,628,843 | A * | 12/1971 | Wynne et al. | 312/294 |
| 3,648,400 | A * | 3/1972 | Wolfe | 43/54.1 |
| 3,758,977 | A * | 9/1973 | Miller | 43/57.1 |
| 3,881,273 | A | 5/1975 | Herring | |
| 3,936,021 | A * | 2/1976 | Salter | 248/543 |
| 3,948,579 | A * | 4/1976 | Schirmer | 312/111 |
| 4,073,085 | A * | 2/1978 | Stremeckus | 43/54.1 |
| 4,198,777 | A * | 4/1980 | Cruzan et al. | 43/57.1 |
| 4,890,414 | A * | 1/1990 | Bridenthal et al. | 43/54.1 |
| 5,228,232 | A * | 7/1993 | Miles | 43/57.1 |
| 5,475,943 | A * | 12/1995 | Hodges | 43/57.1 |
| 5,505,328 | A * | 4/1996 | Stribiak | 220/4.22 |
| 5,555,671 | A * | 9/1996 | Voight et al. | 43/57.1 |
| 5,606,820 | A * | 3/1997 | Suddeth | 43/57.1 |
| 6,385,897 | B1 * | 5/2002 | Klabunde | 43/54.1 |
| 6,516,555 | B2 * | 2/2003 | Buzzell | 43/57.1 |
| 6,766,610 | B1 * | 7/2004 | Lin | 43/54.1 |
| 2002/0003096 | A1 | 1/2002 | Blake | |

OTHER PUBLICATIONS

Print of http://www.aquafly.com/box.html showing a flybox described from p. 2, line 8 through p. 3, line 4 of the specification.
Print of http://shop.store.yahoo.com/lewis-and-clark/medefowaflyb.html showing a "Meiho" waterproof fly bo.
Sales brochure from "PELICAN" (t.m.) showing polymeric cases.

* cited by examiner

BOX FOR STORING FISHING FLIES

FIELD OF THE INVENTION

The present invention relates to boxes for storing flies used for fishing, which boxes are generally of the type including at least two portions, a hinge between the portions affording relative pivotal movement of the portions between open and closed positions, the portions defining at least one enclosed cavity between the portions when in the closed position, the box including material adapted to be releasably engaged by flies within the cavity and a latch mechanism for releasably retaining the housing portions in their closed position.

BACKGROUND OF THE INVENTION

Many boxes are known for storing flies used for fishing, which boxes are generally of the type including at least two portions, a hinge between the portions affording relative pivotal movement of the portions between open and closed positions, the portions defining at least one enclosed cavity between the portions when in the closed position, the box including material adapted to be releasably engaged by flies within the cavity and a latch mechanism for releasably retaining the housing portions in their closed position.

One such box sold by 3M Company, St. Paul, Minn., under the trade designation "C and F Design Waterproof Fly Box" includes an opaque polymeric bottom rectangular dish-like portion and an opaque polymeric cover portion adapted to extend over on open side of the bottom portion, with material adapted to be releasably engaged by flies (i.e., spaced strips of polymeric foam) being positioned both along the inner surface of the cover portion and along the inner surface of a bottom wall of the bottom portion that is spaced from the cover portion. This box is made water proof by means including an O ring around an edge of the bottom portion engaged by the cover portion, and a secure latch assembly that extends the majority of the distance along one side of both portions, both of which add significant costs to manufacturing and assembling the box. The material adapted to be releasably engaged by flies along the bottom wall of the bottom portion can be included in an assembly removeably attached in the box (which can be desirable so that different assemblies to which a different types of flies are attached can be moved into and out of the box), however, the bottom and cover portions of the box are opaque so that a user can not see what types or numbers of flies are within the box without opening it. Also the latch assembly requires the use of two hands to open or close it.

Another such box sold by Aquafly, Inc., San Francisco, Calif., includes two dish-like cover portions, each of which cover portions includes a central wall part, and side wall parts around a periphery of the central wall part projecting generally in the same direction away from the central wall part, and having a continuous distal edge portion opposite the central wall part; a hinge having hinge portions attached to the side wall parts adjacent second sides of the central wall parts, the hinge including a hinge pin generally parallel to the second sides of the central wall parts and affording pivotal movement of the cover portions between a closed position with the distal edge portions of the cover portions opposed, closely spaced from and generally aligned with each other, and an open position with the distal edge portions spaced away from and out of alignment with each other; and a fly retaining assembly comprising a stiff resiliently flexible support plate extending between the distal edge portions of the cover portions when the cover portions are in the closed position. A first side of the support plate is mounted on the hinge pin to affording pivotal movement of the fly retaining assembly relative to the hinge pin independent of the cover portions when the cover portions are in the open position. On each of the major surfaces of the support plate is a layer of flexible material that is engaged by the edge portion of the adjacent cover portion when the cover portions are in the closed position, and that has a central portion adapted to be releasably engaged by flies that is surrounded by the side wall parts of the adjacent cover portion when the cover portion is in the closed position. The support plate includes a flange around the periphery of the support plate that has an inwardly projecting lip along its side opposite the hinge under which an outwardly projecting lip on the adjacent cover portion can be engaged by resilient flexing of the cover portion to retain the cover portion in its closed position. The cover portions on this box are at least semi-transparent so that the quantity and type of flies in the box can be somewhat seen without opening the box, and the box can be closed with one hand; however, the fly retaining assembly can not be removed from the box, and the box may not be as waterproof as may be desired.

DISCLOSURE OF THE INVENTION

The present invention provides a box for storing flies used for fishing including (when closed) a cover assembly around a fly storage assembly. The fly storage assembly is removable from the cover assembly so that different fly storage assemblies can be positioned within the cover assembly, the cover assembly is transparent so that the type and quantity of flies on the fly storage assembly can be easily seen without opening the box, the cover assembly can be closed with one hand, the box when closed is waterproof, and the box is inexpensive to manufacture compared to the boxes for storing flies described above.

The box for storing flies used for fishing according to the present invention comprises the cover assembly that includes two dish-like cover portions, each of which cover portions includes a central wall part having a generally rectangular periphery, and side wall parts around the periphery of the central wall part projecting generally in the same direction away from the central wall part and having a continuous distal edge portion opposite the central wall part; and a hinge having hinge portions attached to the side wall parts adjacent second sides of the central wall parts. The hinge includes a hinge pin generally parallel to the second sides of the central wall parts and affords pivotal movement of the cover portions between a closed position with the distal edge portions of the cover portions opposed to, closely spaced from, and generally aligned with each other, and an open position with the distal edge portions spaced away from and out of alignment with each other. The fly retaining assembly included in the box comprises a stiff resiliently flexible support plate having opposite major surfaces that extends between the distal edge portions of the cover portions when the cover portions are in the closed position, and can have material (e.g., polymeric foam) adapted to be releasably engaged by flies on each of its major surfaces. Releasably engageable means can be provided between a first side of the support plate and the hinge pin for affording pivotal movement of the fly retaining assembly relative to the hinge pin independent of the cover portions when the cover portions are in their open position. A layer of flexible sealing material is provided on each of the major surfaces of the support plate and is in sealing engagement with the edge portion of the adjacent cover portion when the cover portions are in their closed position, and material adapted to be releasably engaged by flies is provided on each major surface of the support plate, in a position that will be surrounded by the side wall parts of the adjacent cover portion when the cover portions are in their closed position. A latch member is provided along a second side of the periphery of the support plate opposite its first side. That latch member has opposite portions each adapted for releasable engagement with a different one of the cover portions to releasably retain the cover portions in their closed position.

The layers of flexible sealing material on the major surfaces of the support plate in sealing engagement with the edge portions of the cover portions when the cover portions are in the closed position can be parts of a collar of the sealing material extending around the edge portion of the support plate, with the collar of the sealing material including lips of the sealing material adapted to extend around and engage the outer surfaces of the side wall parts of the cover portions when the cover portions are in their closed position. The lips have cam surfaces adjacent the cover portions when the cover portions are in their closed position that help to position the lips around and in engagement with the outer surfaces of the side wall parts and help to position the edge portions of the cover portions for proper engagement with the layers of flexible sealing material as the cover portions move from their open to their closed positions. With this structure the sealing engagement between the edge portions of the cover portions and the collar of the sealing material can be essentially water tight. Also, the central wall parts of the cover portions can be resiliently flexible, and with the cover portions in the closed position pressure can be applied to flex the central wall parts toward each other to expel air from within the box between the edge portions of the cover portions and the collar of the sealing material, thereby forming a partial vacuum in the box when the pressure is released. That vacuum will cause external air pressure to press the edge portions of the cover portions more firmly against the sealing material and increase the resistance to water entering the closed box.

The releasably engageable means that can be provided between the first side of the support plate and the hinge pin can comprise the hinge portions being spaced along the hinge pin to provide at least one (and preferably two) exposed portions of the hinge pin free of the hinge portions, and the support plate including at least one (and preferably two) attachment clips along its first side that are pivotably and releasably engaged over the exposed portion or portions of the hinge pin.

The latch member can be integrally molded with the support plate. The opposite portions of the latch member can each include a lip generally parallel with the major surfaces of the support plate and projecting toward the first side of the support plate, which lips each can have a latching surface generally parallel to and spaced from the adjacent major surface of the support plate and a cam surface extending away from the edge of the latching surface adjacent the first side of the support plate. The cover portions can each include a ridge adapted to move along the cam surface on the adjacent portion of the latch member and into engagement with the latching surface on that adjacent portion as the cover portion is moved to its closed position to releasably retain the cover portion in the closed position.

The ridges can be on the side wall parts along the first side of the central wall parts, and those side wall parts can be resiliently flexible so that they can be manually flexed toward the first side of the support plate to release the ridges from beneath the latching surfaces on the lips when the cover portions are in their closed position.

The central fly retaining assembly can be distinctively colored (e.g., its support plate being green, blue, or yellow, and the material on its surfaces adapted to be releasably engaged by flies being grey, black or white). A person can then, for example, use fly retaining assemblies of one color on which to store a certain type of fly, and use fly retaining assemblies of another color to store a different type of fly, and so forth. The distinctive color of the central fly retaining assembly can be easily seen through the transparent cover portions so that a person can easily identify the fly box in which it is contained. Also, a person can have more fly retaining assemblies than cover assemblies, the excess fly retaining assemblies can be stored in a compact storage container, and the fly retaining assembly to which are attached flies the person wishes to use on a particular occasion can be inserted in the cover assembly and carried to the location (e.g., the stream) at which they are to be used.

DESCRIPTION OF THE DRAWING

The present invention will be further described with reference to the accompanying drawing wherein like reference numerals refer to like parts in the several views, and wherein.

DETAILED DESCRIPTION OF THE INVENTION

Figure 1:
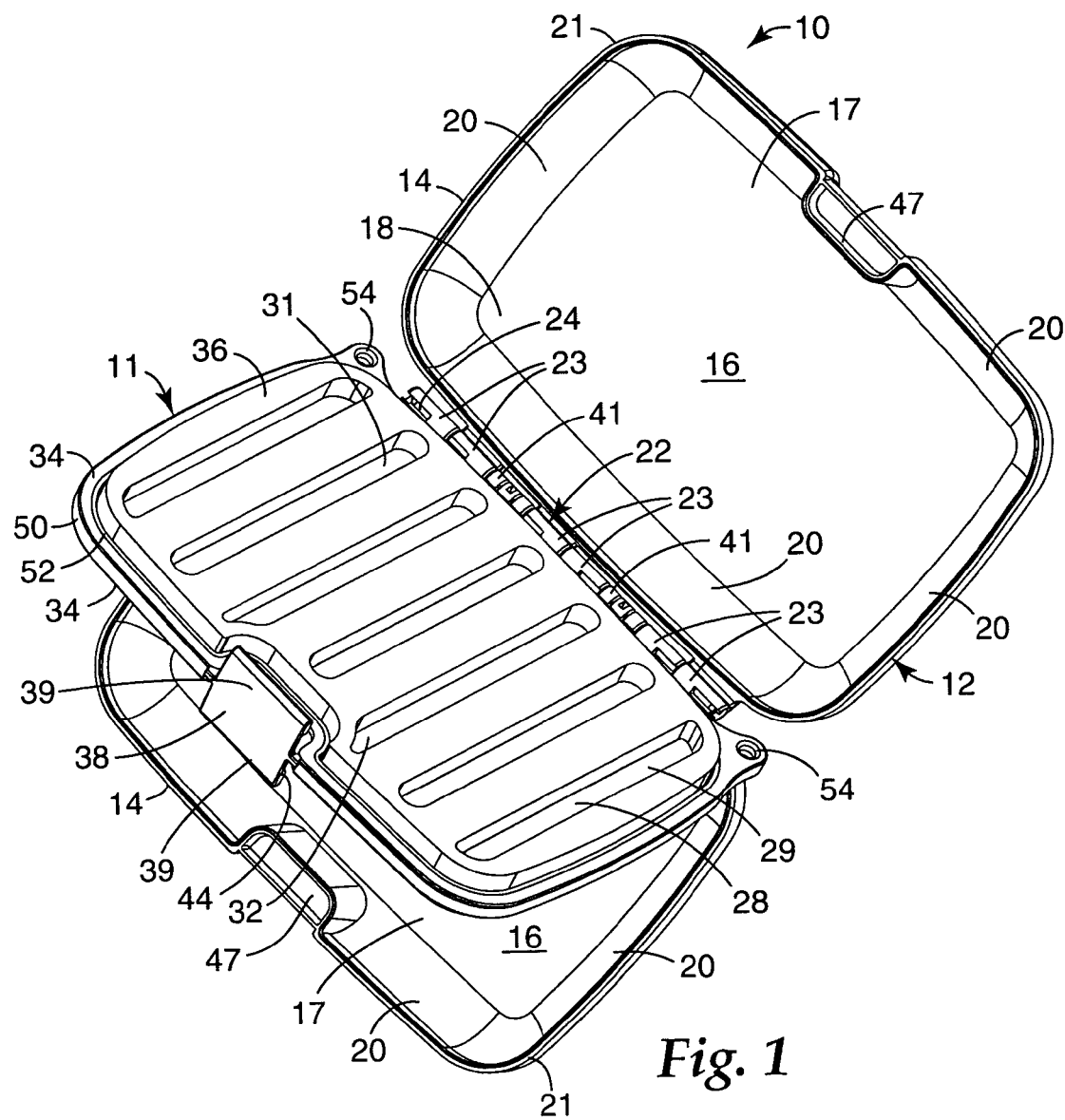
FIG. 1 is a perspective view of a box for storing flies used for fishing according to the present invention with cover portions of a cover assembly included in the box shown in an open position.
Figure 4:
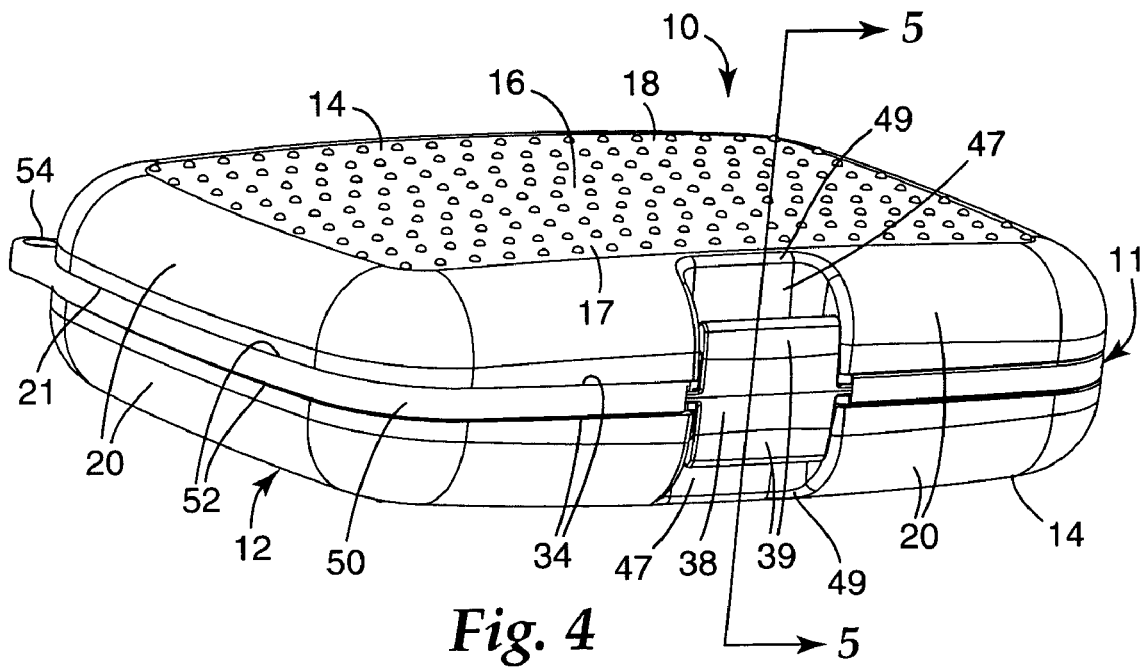
FIG. 4 is a perspective front view of the box of FIG. 1 with the cover portions in a closed position.
Figure 6:
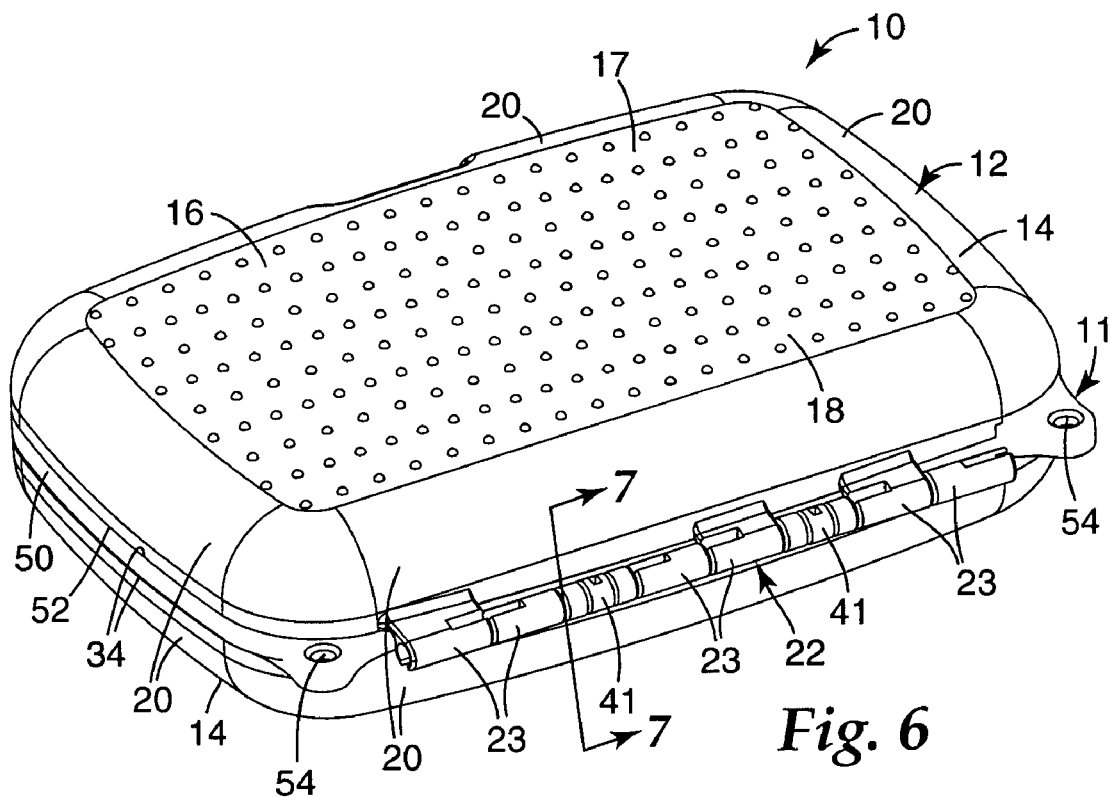
FIG. 6 is a perspective rear view of the box of FIG. 1 with the cover portions in a closed position.
Figure 7:
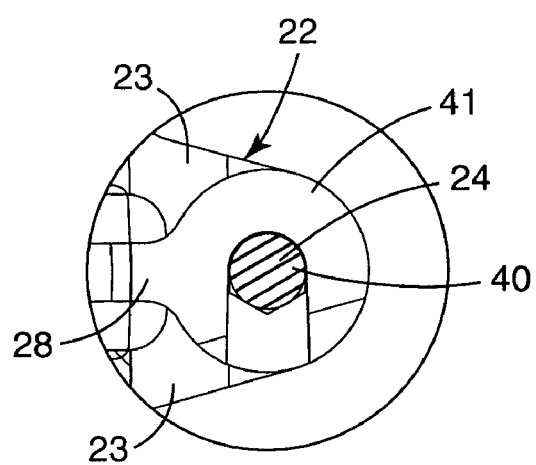
FIG. 7 is an enlarged fragmentary sectional view taken approximately along line 7—7 of FIG. 6.

Referring now to the drawing there is illustrated a box according to the present invention that can be used for storing flies of the type used for fishing, which box is generally designated by the reference numeral 10. The box 10 includes a fly retaining assembly 11 that, as seen in FIGS. 1, 4, and 6, can be attached to and enclosed by a cover assembly 12, and, as seen in FIG. 2, can be removed and separated from the cover assembly 12.

Figure 5:
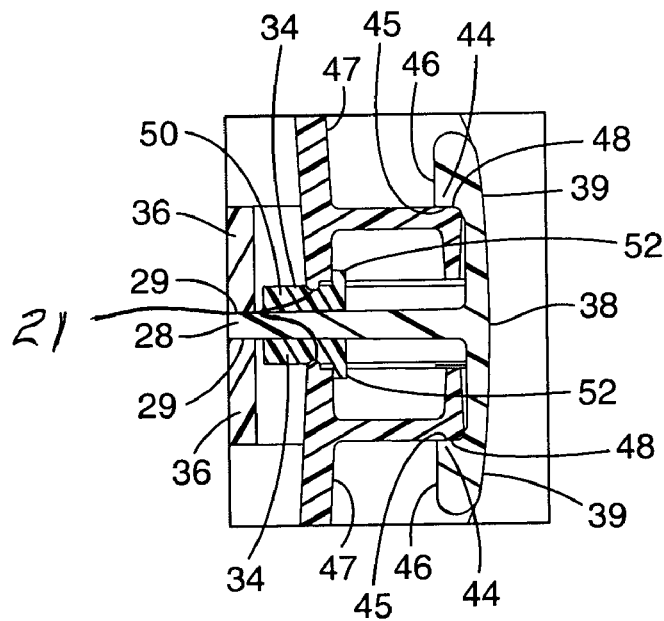
FIG. 5 is an enlarged fragmentary sectional view taken approximately along line 5—5 of FIG. 4.

The cover assembly 12 comprises two dish-like cover portions 14, each of which cover portions 14 is molded of a transparent polymeric material (e.g., 0.09 inch or 0.23 cm thick acrylonitrile-butadiene-styrene or ABS such as Toyolac 920 clear commercially available from Toray Resin Company, Charlotte, N.C.) and includes a central wall part 16 having a generally rectangular periphery with first and second opposite sides 17 and 18, and side wall parts 20 around the periphery of the central wall part 16 projecting generally in the same direction away from the central wall part 16. The side wall parts 20 have a continuous distal edge portion 21 opposite the central wall part 16, which edge portion 21 (see FIG. 5) is reduced in thickness from the major portions of the side wall parts 20 and has a cylindrically arcuate distal surface (e.g., an edge portion 21 0.033 inch or 0.84 cm thick projecting about 0.03 inch or 0.08 cm from the thicker portions of the side wall parts 20). The cover assembly 12 also includes a hinge 22 having hinge portions 23 attached to (e.g., integrally molded with) the side wall parts 20 adjacent the second sides 18 of the central wall parts 16. The hinge 22 includes a metal hinge pin 24 generally parallel to the second sides 18 of the central wall parts 16 that extends through the hinge portions 23 and affords pivotal movement of the cover portions 14 between a closed position (FIGS. 4 and 6) with the edge portions 21 of the cover portions 14 closely spaced from and generally aligned with each other, and an open position (FIGS. 1 and 2) with those edge portions 21 spaced away from and out of alignment with each other. A pair of two hinge portions 23 are positioned adjacent each end of the second sides 18 of the central wall parts 16 and a pair of two hinge portions 23 are positioned at the center of the second sides 18 of the central wall parts 16 with one of the hinge portions 23 in each pair integrally molded with each of the cover portions 14 and rigidly attached to its adjacent side wall part 20 along its entire length so that the hinge 22 restricts flexing of edges 21 along the side wall parts between which it is attached away from each other when the cover portions 14 are in their closed position.

The fly retaining assembly 11 comprises a stiff resiliently flexible support plate 28 (e.g., of 0.07 inch or 0.18 cm thick polypropylene such as Acclear 8439 commercially available from BP AMOCO Chemical Co, Chicago, Ill.) having opposite major surfaces 29, and a periphery with first and second sides 31 and 32. The support plate 28 extends between the edge portions 21 of the cover portions 14 when the cover portions 14 are in their closed position. Releasably engageable means are provided between the first side 31 of the support plate 28 and the hinge pin 24 for affording pivotal movement of the fly retaining assembly 11 relative to the hinge pin 24 independent of the cover portions 14 when the cover portions 14 are in their open position. The fly retaining assembly 11 also includes a layer 34 of soft resiliently flexible sealing material (e.g., a 29 shore A durometer TPE thermoplastic elastomer such as Starflex P7026 black, commercially available from STAR Thermoplastic Alloys and Rubbers, Inc., Chicago, Ill.) on each of the major surfaces 29 of the support plate 28 in sealing engagement with the edge portion 21 of the adjacent cover portion 14 when that cover portion 14 is in its closed position; and a layer of material 36 (e.g., 4.5 to 5.5 pounds per cubic foot closed cell Ethylene Vinyl Acetate (EVA) foam) including spaced strip-like portions adapted to be releasably engaged by the hooks in flies on each major surface 29 of the support plate 28 that is surrounded by the side wall parts 20 of the adjacent cover portion 14 when that cover portion 14 is in its closed position. A latch member 38 is integrally molded with the support plate 28 along the second side 32 of its periphery. The latch member 38 has opposite portions 39 each adapted for releasable engagement with a different one of the cover portions 14 to releasably retain the cover portions 14 in their closed position.

Figure 2:
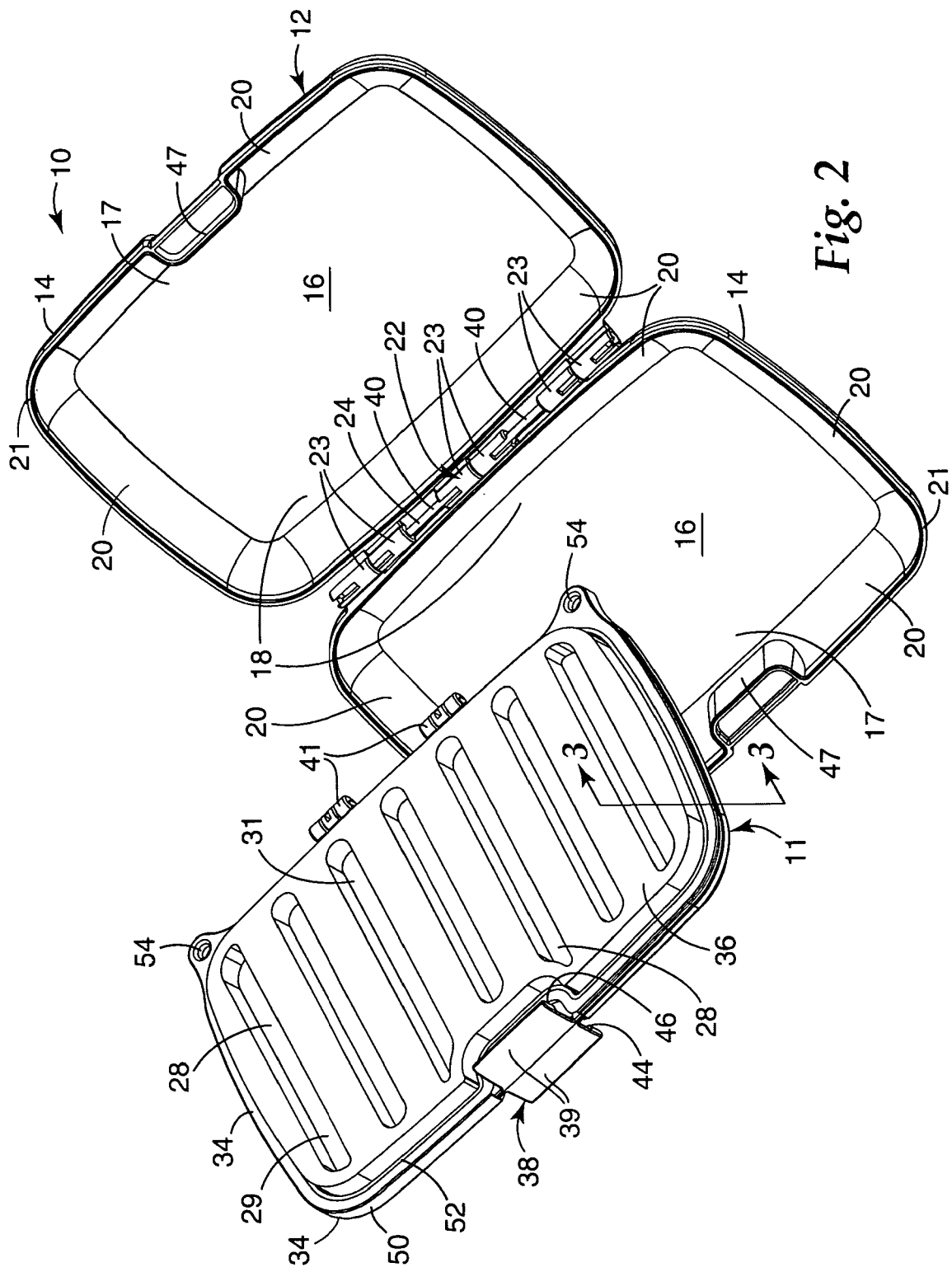
FIG. 2 is a perspective view of the box of FIG. 1 in which the cover portions of the cover assembly are in an open position and a fly retaining assembly included in the box is shown separated and removed from the cover assembly.

The releasably engageable means provided between the first side 31 of the support plate 28 and the hinge pin 24 for affording pivotal movement of the fly retaining assembly 11 relative to the hinge pin 24 independent of the cover portions 14 when the cover portions 14 are in their open position comprises the hinge portions 23 being spaced along the hinge pin 24 to provide at least one exposed portion 40, and, as illustrated in FIG. 2, two spaced exposed portions 40 of the hinge pin 24 that are free of the hinge portions 23, and an equal number of attachment clips 41 (i.e., two clips 41 as illustrated) along the first side 31 of the support plate 28 that are pivotably and releasably engaged over the exposed portions 40 of the hinge pin 24. The clips 41 each include a row of three aligned closely spaced generally C-shaped resiliently flexible parts having a through passageway that will receive one of the portions 40 of the hinge pin 24. The central part in each of the clips 41 extends more than 180 degrees (e.g., 195 degrees) around that portion 40 of the hinge pin 24, and has aligned diverging portions defining an opening into and out of the passageway that is more narrow than the diameter of the pin 24 and are adapted so that with manual pressure the clips 41 can be pressed onto or pulled off of the portion 40 of the hinge pin by manually pressure applied in a direction radial to the pin 24 and centered on those openings in the C-shaped parts.

While the latch member 38 could be attached to the support plate 28 by a suitable adhesive or by mechanical fasteners, preferably as illustrated (see FIG. 5) the latch member 38 is integrally molded with the support plate 28. The opposite portions 39 of the latch member 38 each include a lip 44 spaced above and generally parallel with the adjacent major surface 29 of the support plate 28 and projecting toward the first side 31 of the support plate 28. Those lips 44 each have a latching surface 45 generally parallel to and spaced from the adjacent major surface 29 of the support plate 28 and have a cam surface 46 extending away from the edge of the latching surface 45 adjacent the first side 31 of the support plate 28; and the cover portions 14 each include a ridge 48 adapted to move along the cam surface 46 on the adjacent portion of the latch member 38 (i.e., by resilient deflection of the latch member 38 or cover portion 14 or both) and into engagement with the latching surface 45 on that adjacent portion to releasably retain the cover portion 14 in the closed position.

The ridges 48 are along central recessed portions 47 of the side wall parts 20 along the first side 17 of the central wall parts 16, and the side wall parts 20 along the first sides 17 of the central wall parts 16 are resiliently flexible so that they can be manually flexed (e.g., by hand pressure applied between a thumb on the recessed portion 47 and fingers on the hinge 22) toward the first sides 17 of the support plate 28 sufficiently to release the ridges 48 from beneath the latching surfaces 45 on the lips 44 when the cover portions 14 are in their closed position. A lip 49 can be provided along the intersections of the recessed portions 47 of the side wall parts 20 and the central wall parts 16 to facilitate engagement of a persons thumb or finger with the central recessed portions 47 to flex the cover portions 12 to open them.

The layers 34 of flexible sealing material on the major surfaces 29 of the support plate 28 in sealing engagement with the edge portions 21 of the cover portions 14 when the cover portions 14 are in their closed position are parts of a generally U-shaped collar 50 of the sealing material extending around the edge portion of the support plate 28. That U-shaped collar 50 is applied by over molding the collar 50 around a peripheral edge portion of the support plate 28 soon after the support plate 28 is molded and while the support plate 28 is still hot from being molded. That peripheral edge portion of the support plate 28 is reduced in thickness adjacent its outer edge to facilitate the molding process.

Figure 3:
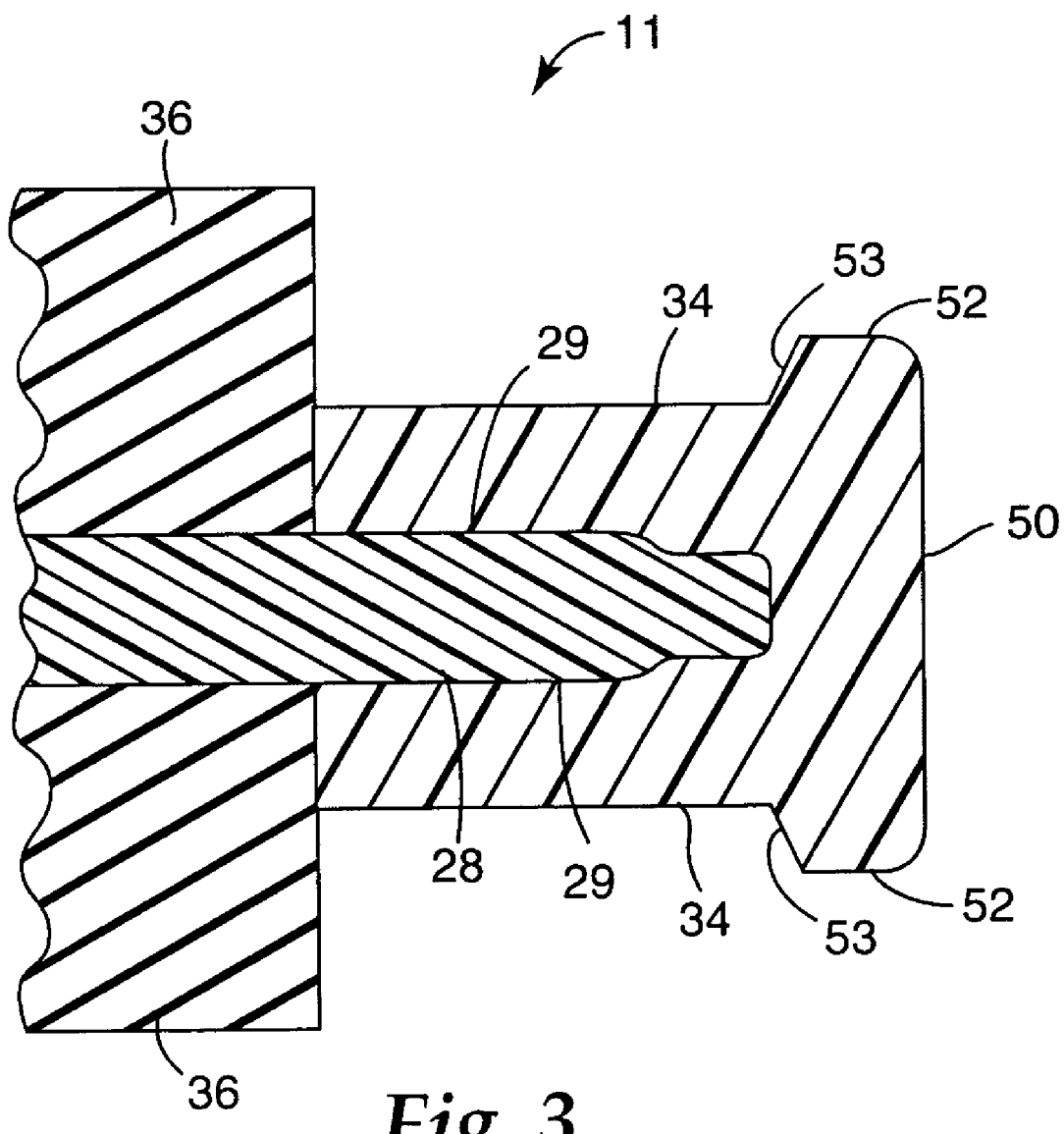
FIG. 3 is a much enlarged fragmentary sectional view taken approximately along line 3—3 of FIG. 2.

The collar 50 of the sealing material includes lips 52 of the sealing material that extend around and engage outer surfaces of the side wall parts 20 of the cover portions 14 when the cover portions 14 are in their closed positions. The lips have cam surfaces 53 (see FIG. 3) adjacent the cover portions 14 when the cover portions 14 are in their closed position. Those cam surfaces 53 cause a small amount of relative movement between the collar 50 and the cover portions 14 to position the lips 52 around and in engagement with the outer surfaces of the side wall parts 20 and position the edge portions 21 of the cover portions 14 for proper engagement with the layers 34 of flexible sealing material as the cover portions 14 move from their open to their closed positions. As an example, the cam surfaces 53 can be disposed at an angle of about 117 degrees with respect to the adjacent surface portions of the collar 50 that are generally parallel to the major surfaces 29 of the support plate 28.

When the cover portions 14 are in their closed positions the sealing engagement between the cover portions 14 and the collar 50 of the sealing material can be essentially water tight (i.e., by water tight we mean that under normal circumstances water will not enter the closed box 10 if it is dropped into a stream of water, and that the closed box 10 can be held under the surface of still water for 20 minutes without having water enter the closed box 10).

The central wall parts 16 of the cover portions 14 are resiliently flexible, and with the cover portions 14 in their closed position manual pressure can be applied to flex the central wall parts 16 toward each other to expel air from within the box 10 between the cover portions 14 and the collar 50 of the sealing material, thereby forming a partial vacuum in the box 10 when the pressure is released. That vacuum will cause external air pressure to press the cover portions 14 more firmly against the collar 50 of the sealing material and increase the resistance to water entering the closed box 10.

The support plate 28 of the fly retaining assembly 11 can be distinctively colored (e.g., in one of several colors including green, blue, yellow) as can the layer of material 36 (e.g., in one of several colors including grey, black or white). A person can then use fly retaining assemblies 11 of one color on which to store a certain type of fly, and use fly retaining assemblies 11 of another color to store a different type of fly, and so forth. The distinctive color of the fly retaining assembly 11 in the closed box 10 can be easily seen through the transparent cover portions 14 so that a person can easily identify the fly box 10 in which it is contained. Also, a person can have more fly retaining assemblies 11 than cover assemblies 12, the excess fly retaining assemblies 11 can be stored in a compact storage container (not shown), and the fly retaining assembly 11 to which are attached flies the person whishes to use on a particular occasion can be inserted in the cover assembly 12 and then carried within the cover assembly 12 to the location (e.g., a stream) at which they may be used.

The fly retaining assembly 11 can include annular portions of the support plate 28 flanking the clips 41 and covered by the collar 50 of the sealing material that have through openings 54 through which a cord (not shown) can pass to secure the box 10 to a user (e.g., to secure the box to a fly fishing vest or waders).

The present invention has now been described with reference to one embodiment thereof. It will be apparent to those skilled in the art that many changes can be made in the embodiments described above without departing from the scope of the present invention. Thus, the scope of the present invention should not be limited to the structures and methods described in this application, but only by the structures and method described by the language of the claims and the equivalents thereof.

What is claimed is:

1. A box for storing flies used for fishing, said box comprising:
a cover assembly comprising:
two dish-like cover portions, each of said cover portions including a central wall part having a generally rectangular periphery with first and second opposite sides, and side wall parts around the periphery of said central wall part projecting generally in the same direction away from said central wall part, and having a continuous distal edge portion opposite said central wall part; and
a hinge having hinge portions attached to said side wall parts adjacent the second sides of said central wall parts, said hinge including a hinge pin generally parallel to the second sides of said central wall parts and affording pivotal movement of said hinge and cover portions between a closed position with said distal edge portions of the cover portions closely spaced from and generally aligned with each other, and an open position with said distal edge portions spaced away from and out of alignment with each other; and
a fly retaining assembly comprising:
a stiff resiliently flexible support plate having opposite major surfaces, a periphery with first and second sides, said support plate extending between the distal edge portions of said cover portions when said cover portions are in said closed position;
releasably engageable means between the first side of said support plate and said hinge pin for affording pivotal movement of said retaining assembly relative to said hinge pin independent of said cover portions when said cover portions are in said open position and for affording, when said cover portions are in said open position, manual removal of said support plate from said hinge pin and separation of said fly retaining assembly from said cover assembly;
a layer of flexible sealing material on each of said major surfaces in sealing engagement with the edge portion of the adjacent cover portion when said cover portions are in said closed position;
material adapted to be releasably engaged by flies on each major surface of said support plate and surrounded by the side wall parts of the adjacent cover portion when said cover portions are in said closed position; and
a latch member along the second side of the periphery of said support plate, said latch member having opposite portions each adapted for releasable engagement with a different one of said cover portions to releasably retain said cover portions in said closed portion;
said layers of flexible sealing material on the major surfaces of the support plate in sealing engagement with the edge portions of the cover portions when the cover portions are in said closed position are parts of a collar of the sealing material extending around the edge of the support plate, said collar of the sealing material includes lips of the sealing material extending around and engaging outer surfaces of the side wall parts of the cover portions when the cover portions are in their closed position and have cam like surfaces adjacent the cover portions that help to position the lips around and in engagement with the outer surfaces of the side wall parts and help to position the edge portions of the cover portions for proper engagement with the layers of flexible sealing material as the cover portions move from their open to their closed positions.

2. A box according to claim 1 wherein said releasably engageable means comprises said hinge portions being spaced along said hinge pin to provide at least one portion of said hinge pin free of said hinge portions, said one portion of said hinge pin being exposed when said support plate is removed from said hinge pin, and said support plate including an attachment clip along said first side and releasably engaged over said portion of said hinge pin.

3. A box according to claim 2 wherein said hinge portions are spaced along said hinge pin to provide two spaced portions of said hinge pin free of said hinge portions, said two portions of said hinge pin being exposed when said support plate is removed from said hinge pin, and said support plate includes two of said attachment clips spaced along said first side and releasably engaged over said portions of said hinge pin.

4. A box according to claim 1 wherein said latch member is integrally molded with said support plate, said opposite portions of said latch member each include a lip generally parallel with the major surfaces of said support plate and projecting toward the first side of said support plate, said lips each having a latching surface generally parallel to and spaced from the adjacent major surface of said support plate and having a cam surface extending away from an edge of said latching surface adjacent the first side of said support plate, and said cover portions each include a ridge adapted to move along the cam surface on the adjacent portion of the latch member and into engagement with the latching surface on that adjacent portion to releasably retain the cover portions in the closed position.

5. A box according to claim 4 wherein the ridges are on the side wall parts along the first side of the central wall parts, and the side wall parts along the first side of the central wall parts are resiliently flexible so that they can be manually flexed toward the first side of the support plate to release the ridges from beneath the latching surfaces on the lips when the cover portions are in said closed position.

6. A box according to claim 1 wherein said sealing engagement between the edge portions of the cover portions and the collar of the sealing material is essentially water tight when the cover portions are in said closed position.

7. A box according to claim 1 wherein said central wall parts of said cover portions are resiliently flexible, and with said cover portions in said closed position pressure can be applied to flex said central wall parts toward each other to expel air from within the box between the edge portions of the cover portions and the collar of the sealing material, thereby forming a partial vacuum in the box when the pressure is released.

8. A box according to claim 1 wherein said fly retaining assembly is distinctively colored.

9. A box for storing flies used for fishing, said box comprising:
a cover assembly comprising:
two dish-like cover portions, each of said cover portions including a central wall part having a generally rectangular periphery with first and second opposite sides, and side wall parts around the periphery of said central wall part projecting generally in the same direction away from said central wall part, and having a continuous distal edge portion opposite said central wall part; and
a hinge having hinge portions attached to said side wall parts adjacent the second sides of said central wall parts, said hinge affording pivotal movement of said hinge and cover portions between a closed position with said distal edge portions of the cover portions closely spaced from and generally aligned with each other, and an open position with said distal edge portions spaced away from and out of alignment with each other; and
a fly retaining assembly comprising:
a stiff resiliently flexible support plate having opposite major surfaces, a periphery with first and second sides, said support plate extending between the distal edge portions of said cover portions when said cover portions are in said closed position;
means between the first side of said support plate and said hinge for affording pivotal movement of said fly retaining assembly independent of said cover portions when said cover portions are in said open position;
a layer of flexible sealing material on each of said major surfaces in sealing engagement with the edge portion of the adjacent cover portion when said cover portions are in said closed position;
material adapted to be releasably engaged by flies on each major surface of said support plate and surrounded wall parts of the adjacent cover portion when said cover portions are in said closed position; and
a latch member along the second side of the periphery of said support plate, said latch member having opposite portions each adapted for releasable engagement with a different one of said cover portions to releasably retain said cover portions in said closed portion;
said layers of flexible sealing material on the major surfaces of the support plate in sealing engagement with the edge portions of the cover portions when the cover portions are in said closed position are parts of a collar of the sealing material extending around the edge of the support plate, said collar of the sealing material includes lips of the sealing material extending around and engaging outer surfaces of the side wall parts of the cover portions when said cover portions are in said closed position and having cam like surfaces adjacent the cover portions that help to position the lips around and in engagement with the outer surfaces of the side wail parts and help to position the edge portions of the cover portions for proper engagement with the layers of flexible sealing material as the cover portions move from their open to their closed positions.

10. A box according to claim 9 wherein said latch member is integrally molded with said support plate, said opposite portions of said latch member each include a lip generally parallel with the major surfaces of said support plate and projecting toward the first side of said support plate, said lips each having a latching surface generally parallel to and spaced from the adjacent major surface of said support plate and having a cam surface extending away from an edge of said latching surface adjacent the first side of said support plate, and said cover portions each include a ridge adapted to move alone the cam surface on the adjacent portion of the latch member and into engagement with the latching surface on that adjacent portion to releasably retain the cover portions in the closed position.

11. A box according in claim 9 wherein the ridges are on the side wall parts along the first side of the central wall parts, and the side wall parts along the first side of the central wall parts are resiliently flexible so that they can he manually flexed toward the first side of the support plate to release the ridges from beneath the latching surfaces on the lips when the cover portions are in said closed position.

12. A box according to claim 9 wherein said sealing engagement between the edge portions of the cover portions and the collar of the sealing material is essentially water tight when the cover portions are in said closed position.

13. A box according to claim 9 wherein said central wall parts of said cover portions are resiliently flexible, and with said cover portions in said closed position pressure can be applied to flex said central wall parts toward each other to expel air from within the box between the edge portions of the cover portions and the collar of the sealing material, thereby forming a partial vacuum in the box when the pressure is released.

14. A box according to claim 9 wherein said fly retaining assembly is distinctively colored.

\* \* \* \* \*

UNITED STATES PATENT AND TRADEMARK OFFICE
CERTIFICATE OF CORRECTION

PATENT NO. : 7,168,204 B2 Page 1 of 1
APPLICATION NO. : 10/869227
DATED : January 30, 2007
INVENTOR(S) : Jeffrey L. Wieringa It is certified that error appears in the above-identified patent and that said Letters Patent is hereby corrected as shown below:

Column 8
Line 35, Claim 1, after "said" insert -- fly --.

Column 10
Line 30, Claim 9, after "rounded" insert -- by the side --.
Line 51, Claim 9, delete "wail" and insert -- wall --, therefor.
Line 11, Claim 10, delete "alone" and insert -- along --, therefor.

Column 11
Line 3, Claim 11, delete "in" and insert -- to --, therefor.
Line 6, Claim 11, delete "he" and insert -- be --, therefor.

Signed and Sealed this

Sixth Day of May, 2008

JON W. DUDAS
*Director of the United States Patent and Trademark Office*